June 2, 1925.  
C. MAYER  
TRICYCLE  
Filed Sept. 4, 1924
1,540,271
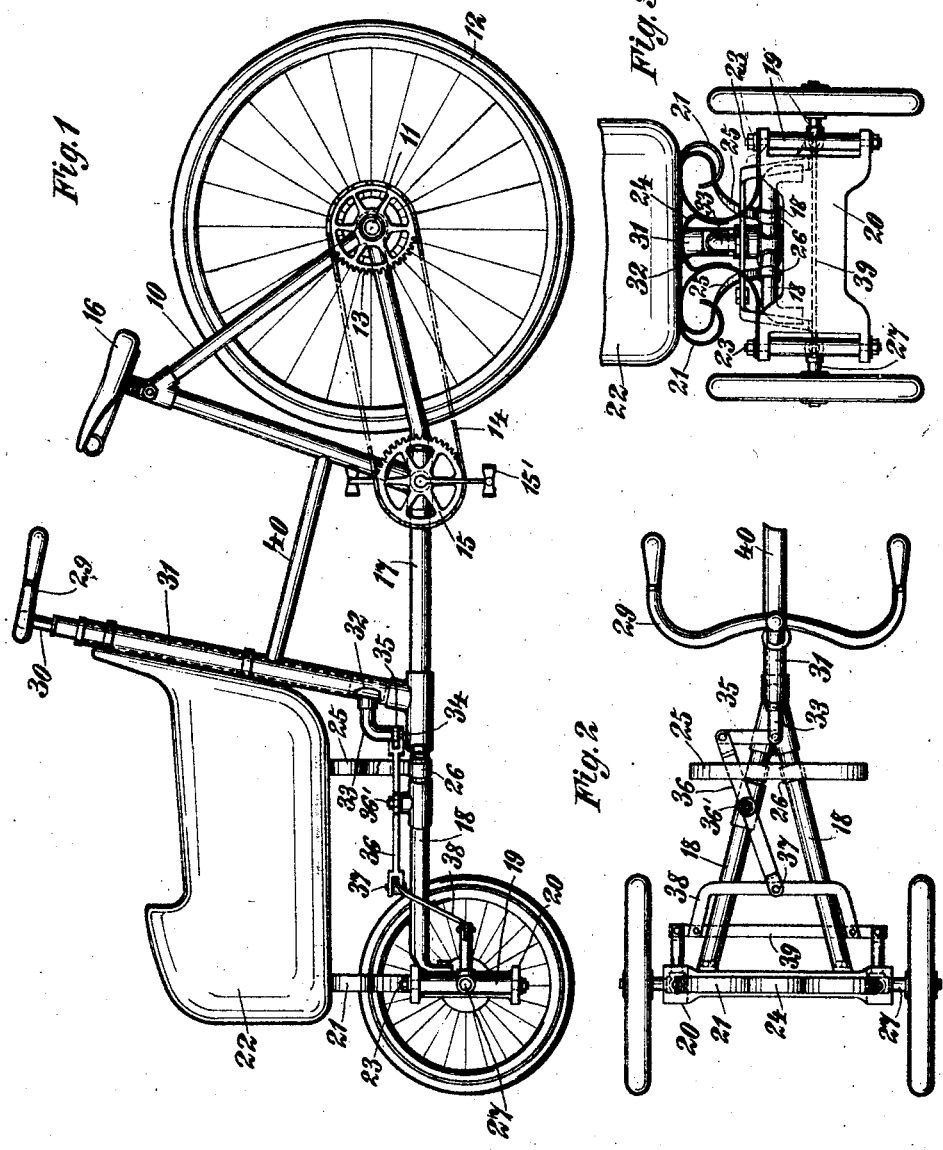
INVENTOR  
Christ Mayer  
BY  
ATTORNEY Patented June 2, 1925.

1,540,271

UNITED STATES PATENT OFFICE.

CHRIST MAYER, OF SALAMANCA, NEW YORK.

TRICYCLE.

Application filed September 4, 1924. Serial No. 735,750.

*To all whom it may concern:*

Be it known that I, CHRIST MAYER, a citizen of the United States, residing at Salamanca, in the county of Cattaraugus and State of New York, have invented certain new and useful Improvements in Tricycles, of which the following is a specification.

This invention relates to improvements in vehicles, particularly tricycles, and it is the principal object of the invention to provide a tricycle having an enclosed space in front of the driver's seat adapted for a passenger, etc., and having two front and one rear wheel.

Another object of the invention is the provision of a tricycle equipped with a plurality of peculiarly shaped springs for supporting the seat for the passenger.

A further object of the invention is the provision of a vehicle of this character with novel steering means ensuring at all times a safe guidance of the vehicle through even the heaviest traffic.

A still further object of the invention is the provision of a vehicle of this type having a comparatively strong bearing frame for the load carried by the vehicle.

These and other objects of the invention will become more fully known as the description thereof proceeds, and will then be specifically pointed out in the appended claims.

In the accompanying drawings, forming a material part of this disclosure:—

Figure 1 is a side elevation of a vehicle constructed according to the present invention.

Figure 2 is a fragmentary top plan view thereof.

Figure 3 is a front end elevation.

The vehicle comprises the customary bicycle rear frame generally indicated at 10, which carries the rear axle 11 for the rear wheel 12 and a sprocket wheel 13 over which drive chain 14 is guided, the chain passing over a sprocket wheel 15 rotated by the usual pedals 15'. One of the posts of the frame 10 carries a saddle 16, and a substantially horizontal bar 17 connects the rear frame 10 with the front frame, which comprises two diverging bars 18 having their front ends attached to substantially vertical bars 19 thus providing a support for a frame 20 on which the front spring 21 rests to support the front part of the shoe-like passenger body 22. This spring comprises two substantially C-shaped, flat elastic bands of spring metal having their lower elongated ends secured to the top of the frame 20, as indicated at 23 in Figure 3, and a curved band of spring metal 24 connects the rear parts of the C shaped parts.

The rear part of the body 22 is supported by means of similarly shaped, substantially C-shaped, flat band springs 25 connected at their upper meeting ends and wound with their lower ends about the pipes or bars 18, as indicated at 26.

The front axles 27 are journalled in the bars 19 and carry the front wheels 28.

The steering of the wheels is effected in the customary manner by means of the handle bar 29 attached to the upper end of a rod 30 encased within the post 31 attached at its lower end to the frame bar 17 by means of the customary T-sleeve.

The post 31 has near its lower end an opening 32 through which extends a sleeve 33 secured to bar 30 which has attached, as indicated at 34, a link 35 to the outer end of which is secured an arm 36 pivotally attached intermediate its ends as at 36' to one of the frame bars 18, and having its outer end secured, as at 37, to a fork 38 in approximately the middle thereof, the prongs of which are attached to the customary steering rods or bar 39 for the front wheels. A connecting bar 40 connects the post 31 with the saddle post of frame 10.

Changes may be made in the general arrangement and in the specific construction of the minor details of my invention without departing from the scope and spirit thereof as specified in the appended claims.

Having thus described my invention, what I claim as new and desire to secure by Letters Patent, is:—

In a tricycle having two front wheels and one rear wheel, the combination of the frame including two diverging front bars and a front frame, a shoe-like passenger body in front of the driver's seat, two substantially C-shaped flat band springs secured with their extended lower ends to said front frame to support the front part of said body, connections for said springs, two substantially C-shaped band springs supporting the rear part of said body and having their lower ends wound about the diverging bars, and means for steering the vehicle.

In witness whereof I have affixed my signature.

CHRIST MAYER.